United States Patent
Tomita et al.

(10) Patent No.: US 10,819,045 B2
(45) Date of Patent: Oct. 27, 2020

(54) BONDER CAP ACCOMMODATING STRUCTURE, ELECTRICAL CONNECTION BOX, AND WIRE HARNESS

(71) Applicant: Yazaki Corporation, Tokyo (JP)

(72) Inventors: Kei Tomita, Shizuoka (JP); Daiki Yamamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/695,143

(22) Filed: Nov. 25, 2019

(65) Prior Publication Data
US 2020/0176894 A1    Jun. 4, 2020

(30) Foreign Application Priority Data
Nov. 29, 2018    (JP) ................... 2018-223186

(51) Int. Cl.
*H01R 4/22*    (2006.01)
*H02G 3/16*    (2006.01)

(52) U.S. Cl.
CPC ............... *H01R 4/22* (2013.01); *H02G 3/16* (2013.01)

(58) Field of Classification Search
CPC ............ H01R 4/22; H01R 13/00; H02G 3/16
USPC ..................................................... 174/520
See application file for complete search history.

(56) References Cited

U.S. PATENT DOCUMENTS

| | | | | |
|---|---|---|---|---|
| 2,396,725 A | * | 3/1946 | Thomas, Jr. | H01R 31/00 439/590 |
| 2,890,266 A | * | 6/1959 | Bollmeier | H01R 4/22 174/87 |
| 2,930,835 A | * | 3/1960 | Bollmeier | H02G 15/113 174/76 |
| 3,466,384 A | * | 9/1969 | Helmut | H02G 15/10 174/92 |
| 3,636,240 A | * | 1/1972 | Quante | H02G 15/113 174/92 |
| 3,676,574 A | * | 7/1972 | Johansson | H01R 4/26 174/87 |
| 3,919,460 A | * | 11/1975 | Neail | H02G 1/14 174/87 |
| 3,936,129 A | * | 2/1976 | Guy | H01R 13/516 439/464 |
| 4,358,634 A | * | 11/1982 | Dienes | H02G 15/18 174/88 R |
| 4,737,600 A | * | 4/1988 | Mathis | G02B 6/4476 174/74 A |

(Continued)

FOREIGN PATENT DOCUMENTS

JP    3334099 B2    10/2002
JP    2007-66662 A    3/2007
JP    5896416 B2    3/2016

*Primary Examiner* — Binh B Tran
*Assistant Examiner* — Krystal Robinson
(74) *Attorney, Agent, or Firm* — Kenealy Vaidya LLP

(57) ABSTRACT

A bonder cap includes a plurality of electrical wire bundles each having conductor parts in a plurality of electrical wires therein connected together and covered by a bonder cap; a tying member configured to tie the bonder caps together by being integrally wound around the bonder caps that are included in the electrical wire bundles; and an accommodating part into which the bonder caps that have been tied together by the tying member are inserted and in which the bonder caps are integrally accommodated.

8 Claims, 8 Drawing Sheets

(56) References Cited

U.S. PATENT DOCUMENTS

| | | | | |
|---|---|---|---|---|
| 4,913,522 A * | 4/1990 | Nolf | G02B 6/4442 | 385/135 |
| 4,982,054 A * | 1/1991 | De Bruycker | H02G 15/013 | 156/49 |
| 5,864,091 A * | 1/1999 | Sumida | H02G 3/088 | 174/50 |
| 5,877,944 A * | 3/1999 | Onizuka | H01H 85/20 | 361/644 |
| 6,108,202 A * | 8/2000 | Sumida | H05K 7/026 | 361/690 |
| 6,551,119 B1 * | 4/2003 | Sakamoto | H01R 13/514 | 439/287 |
| 6,848,948 B1 * | 2/2005 | Khemakhem | H01P 1/045 | 439/668 |
| 7,515,805 B2 * | 4/2009 | Vongseng | G02B 6/445 | 385/135 |
| 7,780,467 B2 * | 8/2010 | Daily | H01R 9/22 | 439/440 |
| 9,203,224 B2 | 12/2015 | Yamamoto et al. | | |
| 9,698,529 B1 * | 7/2017 | Schow | H01R 9/2416 | |
| 9,987,950 B2 * | 6/2018 | Yadav | H01R 13/73 | |
| 2002/0019165 A1 * | 2/2002 | Aoki | B60R 16/0207 | 439/502 |
| 2002/0049002 A1 * | 4/2002 | Higashida | H01R 13/60 | 439/677 |
| 2002/0050387 A1 * | 5/2002 | Blaha | H01R 13/5025 | 174/87 |
| 2003/0019649 A1 * | 1/2003 | Rubenstein | H02G 3/22 | 174/654 |
| 2004/0104039 A1 * | 6/2004 | Herbert King, Jr. | H01R 4/22 | 174/87 |
| 2006/0011372 A1 * | 1/2006 | Rodrigues | H01R 4/70 | 174/92 |
| 2006/0042079 A1 * | 3/2006 | King, Jr. | H01R 4/22 | 29/838 |
| 2006/0217792 A1 * | 9/2006 | Hussein | A61N 1/16 | 607/122 |
| 2007/0178747 A1 * | 8/2007 | Schrader | H01R 4/4827 | 439/441 |
| 2008/0311781 A1 * | 12/2008 | Wojcik | H01R 13/506 | 439/352 |
| 2010/0129043 A1 * | 5/2010 | Cooke | G02B 6/3849 | 385/139 |
| 2010/0132979 A1 * | 6/2010 | Chen | H02G 3/32 | 174/135 |
| 2010/0202736 A1 * | 8/2010 | Roth | G02B 6/3897 | 385/59 |
| 2010/0220969 A1 * | 9/2010 | Utz | G02B 6/4465 | 385/136 |
| 2010/0279529 A1 * | 11/2010 | Ng Vern Shen | H01R 13/5837 | 439/153 |
| 2013/0284482 A1 * | 10/2013 | Moss | H02G 3/14 | 174/53 |
| 2014/0093217 A1 * | 4/2014 | Lu | G02B 6/44 | 385/135 |
| 2014/0191457 A1 * | 7/2014 | Sharma | B23K 3/087 | 269/37 |
| 2015/0056832 A1 * | 2/2015 | Fransen | H04Q 1/02 | 439/153 |
| 2015/0236489 A1 * | 8/2015 | Yamamoto | H01R 4/22 | 174/520 |
| 2015/0260936 A1 * | 9/2015 | Newbury | G02B 6/3885 | 385/135 |
| 2016/0142030 A1 * | 5/2016 | Hamner | H01B 11/002 | 174/70 R |
| 2017/0063069 A1 * | 3/2017 | Kawada | H01B 7/0045 | |
| 2017/0179636 A1 * | 6/2017 | Yudate | H01R 4/18 | |
| 2017/0214183 A1 * | 7/2017 | Fukuhara | H01R 13/641 | |
| 2017/0215291 A1 * | 7/2017 | Tsubouchi | H05K 5/0247 | |
| 2019/0338583 A1 * | 11/2019 | Jude | E06B 3/70 | |
| 2019/0363481 A1 * | 11/2019 | Paynter | H01R 24/40 | |

* cited by examiner

BONDER CAP ACCOMMODATING STRUCTURE, ELECTRICAL CONNECTION BOX, AND WIRE HARNESS

CROSS-REFERENCE TO RELATED APPLICATION(S)

The present application claims priority to and incorporates by reference the entire contents of Japanese Patent Application No. 2018-223186 filed in Japan on Nov. 29, 2018.

BACKGROUND OF THE INVENTION

1. Field of the Invention

The present invention relates to a bonder cap accommodating structure, an electrical connection box, and a wire harness.

2. Description of the Related Art

Available examples of an electrical wire to be used in a vehicle such as an automobile and be wired through an electrical connection box include one that is obtained by electrically connecting together conductors in respective end portions of a plurality of electrical wires and is wired with a connecting portion thereof covered with what is called a bonder cap. For example, electrical wires each obtained by electrically connecting together respective end portions of a plurality of electrical wires and configured to be accommodated in an electrical connection box while being covered with a bonder cap are disclosed in Japanese Patent No. 3334099, Japanese Patent No. 5896416, and Japanese Patent Application Laid-open No. 2007-066662.

In recent years, the number of electrical wires that are wired in a vehicle has tended to increase as the number of electronic components used in an automobile has been increasing. The number of bundles of electrical wires with each of the bundles having a plurality of electrical wires connected together and covered with a bonder cap has tended to increase as a consequence. A bundle of electrical wires to be protected by a bonder cap is accommodated in and attached to an electrical connection box after the bonder cap is overlaid thereon. When there are a large number of such bonder caps, this attachment work may be burdensome.

SUMMARY OF THE INVENTION

The present invention has been made in consideration of the above inconvenience and is directed to providing a bonder cap accommodating structure, an electrical connection box, and a wire harness that can be ensure the easiness of the attachment work.

A bonder cap accommodating structure according to one aspect of the present invention includes a plurality of electrical wire bundles each having conductor parts in a plurality of electrical wires therein connected together and covered by a bonder cap; a tying member configured to tie the bonder caps together by being integrally wound around the bonder caps that are included in the electrical wire bundles; and an accommodating part into which the bonder caps that have been tied together by the tying member are inserted and in which the bonder caps are integrally accommodated.

According to another aspect of the present invention, in the bonder cap accommodating structure, it is preferable that the tying member ties the bonder caps in a position in a side of leading ends of the bonder caps.

An electrical connection box according to still another aspect of the present invention includes a housing configured to accommodate an electronic component; and a bonder cap accommodating structure provided in the housing, wherein the bonder cap accommodating structure includes a plurality of electrical wire bundles each having conductor parts in a plurality of electrical wires therein connected together and covered by a bonder cap, a tying member configured to tie the bonder caps together by being integrally wound around the bonder caps that are included in the electrical wire bundles, and an accommodating part into which the bonder caps that have been tied together by the tying member are inserted and in which the bonder caps are integrally accommodated.

A wire harness according to still another aspect of the present invention includes a conductive routing member; and an electrical connection box connected to the routing member, wherein the electrical connection box includes a housing configured to accommodate an electronic component, and a bonder cap accommodating structure provided in the housing, and the bonder cap accommodating structure includes a plurality of electrical wire bundles each having conductor parts in a plurality of electrical wires therein connected together and covered by a bonder cap, the electrical wires forming the routing member, a tying member configured to tie the bonder caps together by being integrally wound around the bonder caps that are included in the electrical wire bundles, and an accommodating part into which the bonder caps that have been tied together by the tying member are inserted and in which the bonder caps are integrally accommodated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of a bonder cap accommodating structure, an electrical connection box, and a wire harness according to the present invention, with reference to the accompanying drawings. This embodiment is not intended to limit this invention. Components described in the following embodiment include components that are replaceable and easily conceivable by the skilled person or are substantially identical to one another.

In the following description, three directions that intersect one another are referred to as a "first direction X", a "second direction Y", and a "third direction Z" for the sake of convenience. Herein, the first direction X, the second direction Y, and the third direction Z are perpendicular to one another. In a typical case, the third direction Z corresponds to a direction in which a bonder cap 30 is inserted into an accommodating part 20, which is described later, and also corresponds to a direction in which an upper cover, a frame 12, and an underside cover 13, which are also described later, are stacked. The first direction X and the second direction Y are different directions perpendicular to the third direction Z. The following description may refer to one side of the frame 12 that faces the upper cover as an upper zone or an upper side, and refers to another side of the frame 12 that faces the underside cover 13 as a lower zone or a lower side in the third direction Z.

Embodiment

Figure 1:
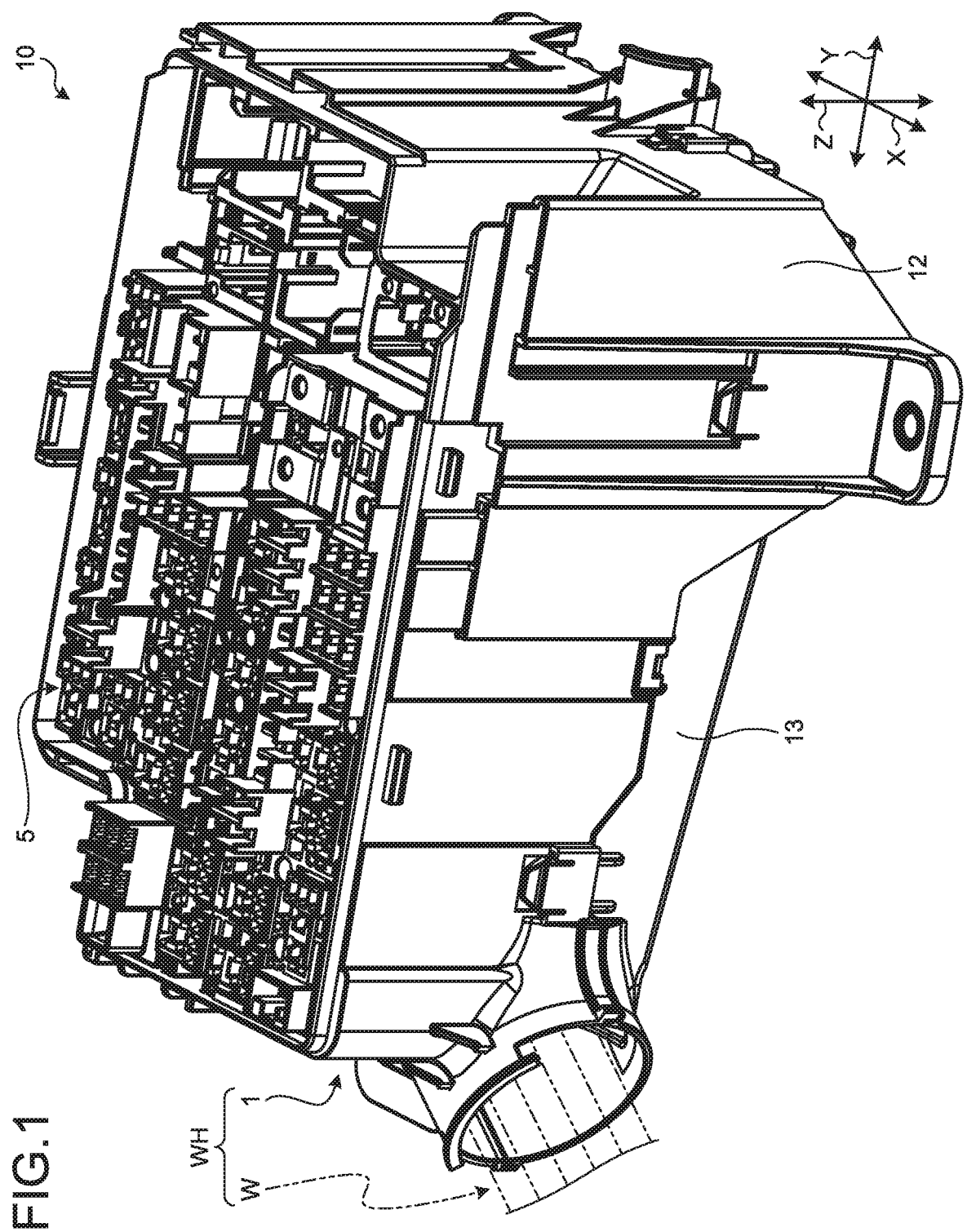
FIG. 1 is a perspective view of an electrical connection box according to an embodiment.

FIG. 1 is a perspective view of an electrical connection box 1 according to an embodiment. The electrical connection box 1 illustrated in the embodiment is installed in a vehicle such as an automobile and incorporated into a wire harness WH. The wire harness WH is a member obtained by, for example, bundling a plurality of routing members W into an assembled component and enabling the routing members W to be connected via connectors or the like to corresponding devices installed in the vehicle so that these devices can be connected to one another. The routing members W are used for feeding power from a power supply or signal communication. The wire harness WH includes the conductive routing members W and the electrical connection box 1 to be electrically connected to the routing members W. Each of the routing members W is, for example, a metal rod, an electrical wire, or a bundle of electrical wires. The metal rod is obtained by covering the outer side of a conductive rod-like member with an insulating covering part. The electrical wire is obtained by covering a conductor part (core) composed of a plurality of conductive metal strands with an insulating covering part. The bundle of electrical wires is obtained by bundling such electrical wires. While the wire harness WH bundles and consolidates these routing members W, the electrical connection box 1 is electrically connected to the wire harness WH via connectors or the like provided to respective terminals of the routing members W. The wire harness WH may further include members such as a grommet, a protector, and a retainer.

The electrical connection box 1 consolidates and accommodates therein pieces of electrical equipment such as a connector, a fuse, a relay, a capacitor, a branching part, and an electronic control unit. The electrical connection box 1 is installed in, for example, an engine room of the vehicle or a vehicle interior. The electrical connection box 1 is connected via the routing members W and other members to and between a power supply such as a battery and each device among various electronic devices mounted on the vehicle. The electrical connection box 1 distributes power fed from the power supply to the various electronic devices mounted on the vehicle. Although the electrical connection box 1 may be otherwise called a junction box, a fuse box, a relay box, or the like, the present embodiment collectively terms them as an electrical connection box.

Specifically, the electrical connection box 1 includes a housing 10 and various electronic components 5. The housing 10 is made of a resin material and is enabled to accommodate the electronic components 5. The housing 10 includes the frame 12, the upper cover (not illustrated) that is attached to the upper part of the frame 12, and the underside cover 13 that is attached to the lower part of the frame 12. FIG. 1 illustrates a state in which the upper cover has been removed.

Figure 2:
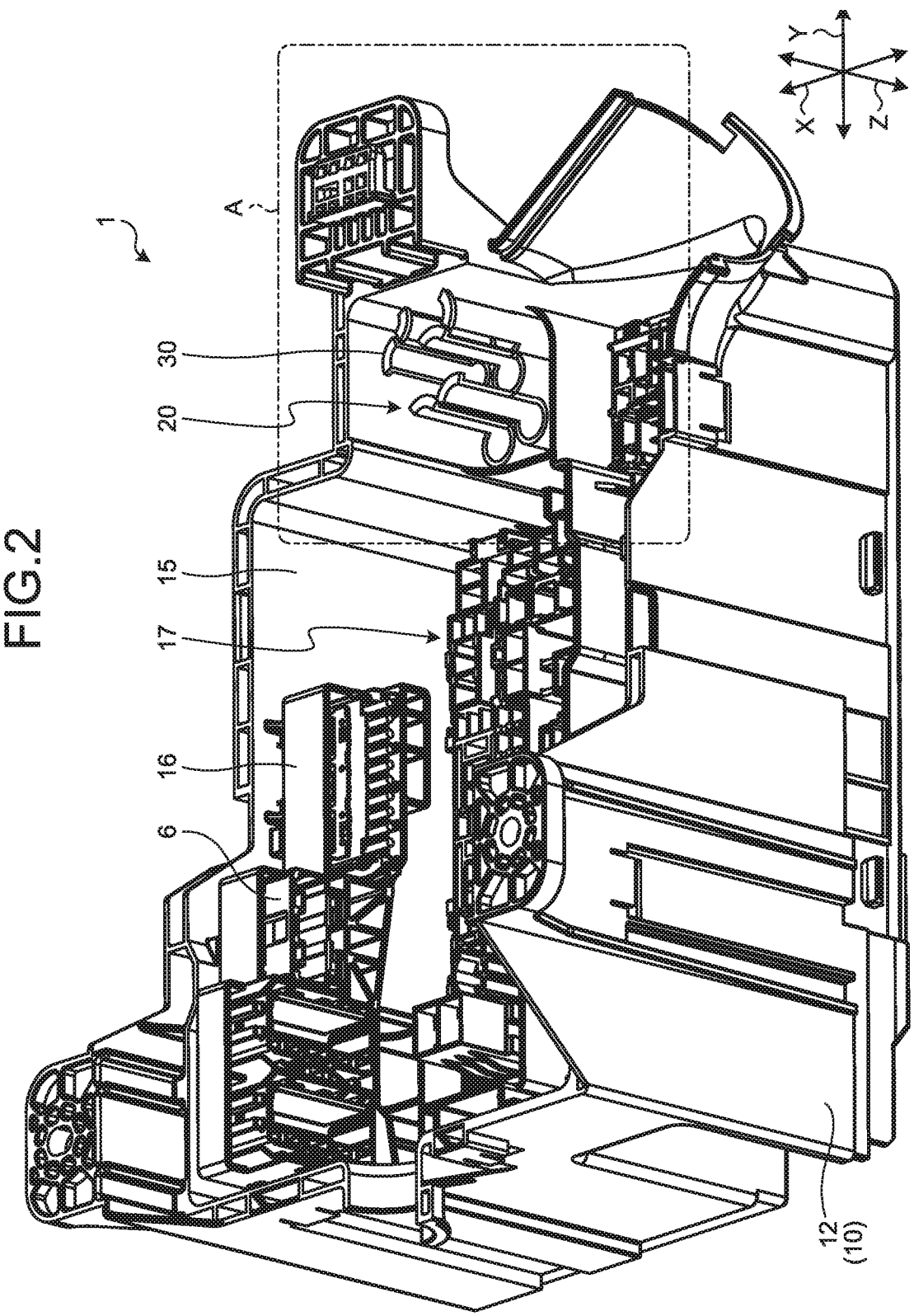
FIG. 2 is a perspective view of the electrical connection box illustrated FIG. 1 as viewed from below.

FIG. 2 is a perspective view of the electrical connection box 1 illustrated FIG. 1 as viewed from below. FIG. 2 is a perspective view of the electrical connection box 1 as viewed from below with the underside cover 13 removed therefrom. On one inner wall 15 of the frame 12, a connector holder 16 to which a joint connector 6 is connected is disposed under a base 17 on which an electronic component 5 is mounted. The connector holder 16 is disposed on the inner wall 15 of the frame 12 and in a position relatively close to the lower end of the inner wall 15, that is, in a position relatively close to the underside cover 13 (see FIG. 1). The connector holder 16 is provided in an orientation such that the joint connector 6 can be inserted therein in a direction perpendicular to the inner wall 15. Inside the frame 12, the accommodating part 20 that can accommodate therein the bonder cap 30 is provided.

Figure 3:
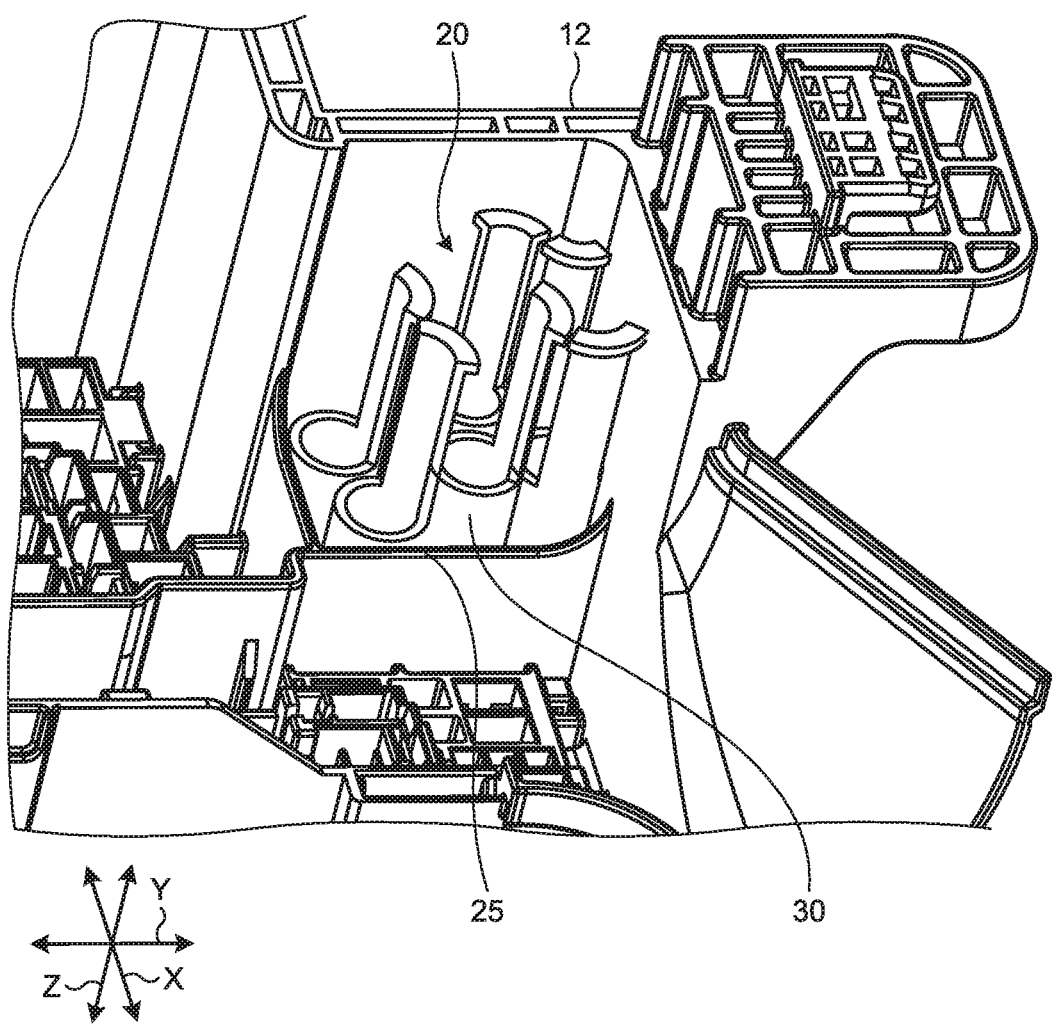
FIG. 3 is a detailed view of a part A of FIG. 2.

FIG. 3 is a detailed view of a part A of FIG. 2. The accommodating part 20 is enabled to accommodate the two or more bonder caps 30. The accommodating part 20 has an opening part 25 positioned at a lower end of the accommodating part 20 in the third direction Z and opening downward in the third direction Z. To be accommodated into the accommodating part 20, which opens downward, the bonder cap 30 faces upward in the third direction Z when being accommodated in the accommodating part 20. In FIG. 3, the upward and downward directions are opposite to the actual upward and downward directions, the upper side of the page having FIG. 3 corresponds to the lower side of the electrical connection box 1.

Figure 4:
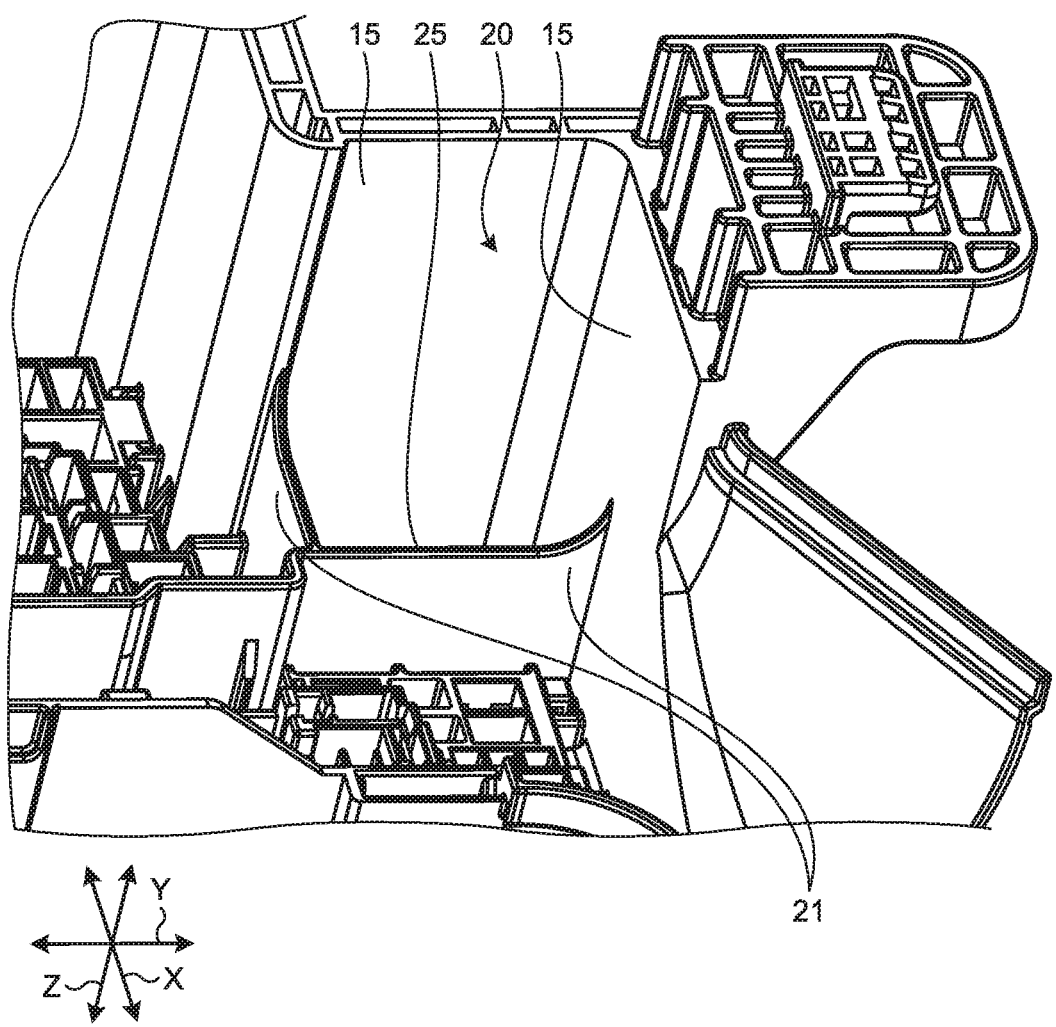
FIG. 4 is an explanatory view illustrating an accommodating part illustrated in FIG. 2 with bonder caps removed therefrom.
Figure 5:
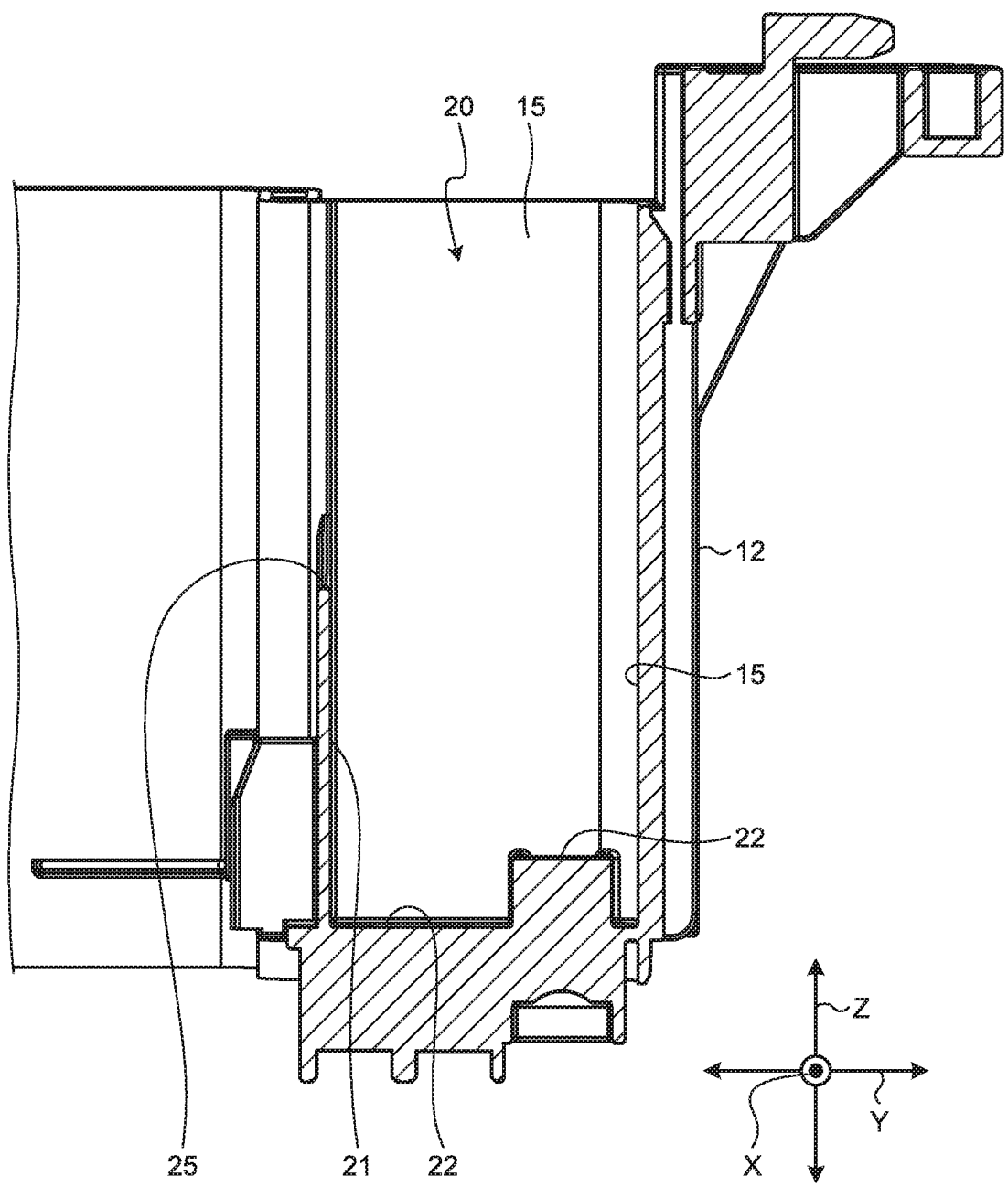
FIG. 5 is a sectional view of the accommodating part illustrated in FIG. 4.

FIG. 4 is an explanatory view illustrating the accommodating part 20 illustrated in FIG. 2 with the bonder caps 30 removed therefrom. FIG. 5 is a sectional view of the accommodating part 20 illustrated in FIG. 4. The accommodating part 20 has wall parts 21 and a bottom part 22. The wall part 21 is provided upright from inner walls 15 of the frame 12. While being positioned on one side of the accommodating part 20 that is opposite in the third direction Z to another side thereof on which the opening part 25 is positioned, the bottom part 22 closes the accommodating part 20. More specifically, in the present embodiment, the accommodating part 20 is disposed in the neighborhood of a portion of the frame 12 at which the inner walls 15 that extend along two different directions intersect each other. That is, the accommodating part 20 is formed in the neighborhood of a corner portion of the frame 12. Thus, the inner walls 15 that extend along two different directions that form the corner portion inside the frame 12 in the neighborhood of which the accommodating part 20 is disposed also form the accommodating part 20.

The wall parts 21 that the accommodating part 20 has are formed in such a manner that the two wall parts 21 are provided upright from the respective inner walls 15 that extend along two different directions. For this reason, the wall parts 21 are disposed while facing in different directions. While one of the wall parts 21 is provided upright toward the first direction X from one of the inner walls 15 that extend in two directions, the other wall part 21 is provided toward the second direction Y upright from the other inner wall 15. These two wall parts 21 thus disposed in different directions intersect each other in such a manner as to form a corner portion. As a result, as viewed in the third direction Z, the accommodating part 20 has a substantially rectangular shape formed by the inner walls 15 that extend in two different directions and the two wall parts 21.

While being positioned on one side of the accommodating part 20 that is opposite in the third direction Z to another side thereof on which the opening part 25 is positioned, the bottom part 22 are adjoined by the inner walls 15 that extend in two different directions and by the two wall parts 21. Thus, the bottom part 22 closes the accommodating part 20 in a position opposite across the accommodating part 20 in the third direction Z to a position in which the opening part 25 is. In the present embodiment, the bottom part 22 is positioned on the upper end side of the accommodating part 20 and closes the upper end side of the accommodating part 20. In the present embodiment, the bottom part 22 has a difference in level, that is, has parts the positions of which are different in the third direction Z.

Figure 6:
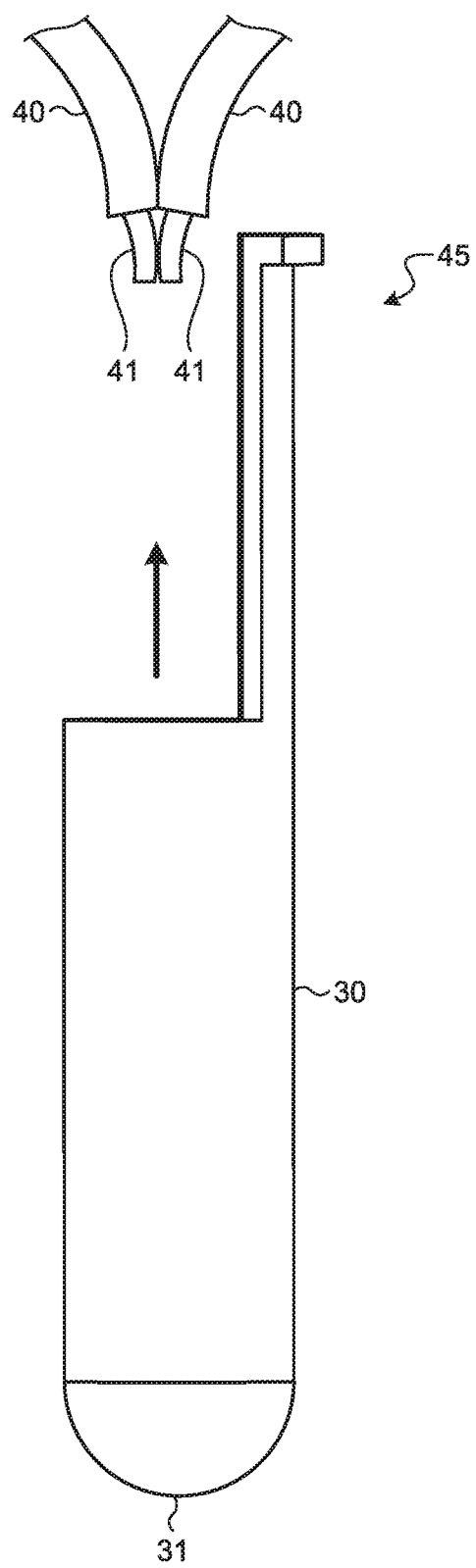
FIG. 6 is an explanatory view illustrating one of the bonder caps illustrated in FIG. 3.

FIG. 6 is an explanatory view illustrating one of the bonder caps 30 illustrated in FIG. 3. Each of the bonder caps 30 is formed in a substantially cylindrical shape having one side thereof closed and therefore being bottomed and is a member made of synthetic resin. The bonder cap 30 is enabled to be overlaid, so as to protect the conductor parts 41, on portions connected together of the conductor parts 41 of a plurality of electrical wires 40 included in the routing members W. More specifically, the respective electrical wires 40 are covered electrical wires, and each of the electrical wire 40 has insulating covering thereof removed and a core, which is the conductor part 41, exposed in an end portion thereof. In the plurality of electrical wires 40, exposed portions of the cores, that is, exposed portions of the conductor parts 41, are electrically connected together by welding or the like. Thus, the respective conductor parts 41 are connected together in the plurality of electrical wires 40.

The bonder cap 30 is overlaid, so as to cover the conductor parts 41, on the plurality of electrical wires 40 that have the conductor parts 41 thereof connected together. That is, the bonder cap 30 is formed in a substantially cylindrical shape that is bottomed, and therefore is overlaid on the electrical wires 40 from one side of the bonder cap 30 opposite to a leading end portion 31, which is an end portion in the closed side thereof. Thus, the conductor parts 41 connected together in the plurality of electrical wires 40 are caused to enter the inside of the bonder cap 30, and portions of the electrical wires 40 are caused to enter the inside of the bonder cap 30. The portions are, in one side of the electrical wires 40 in which the conductor parts 41 are exposed, around end portions of the electrical wires 40 and including the conductor parts 41.

Portions of the electrical wires 40 around end portions of the conductor parts 41 in one side thereof in which the conductor parts 41 are exposed are thus caused to enter the inside of the bonder cap 30, whereby the bonder cap 30 is enabled to perform waterproofing and insulating functions by covering portions through which the conductor parts 41 are connected together. The plurality of electrical wires 40 having the conductor parts 41 thereof connected together and covered by the bonder cap 30 form an electrical wire bundle 45. A plurality of such electrical wire bundles 45, in each of which the two or more electrical wires 40 are covered by the bonder cap 30, are used because the accommodating part 20 (see FIG. 3) is enabled to accommodate the two or more bonder caps 30.

FIG. 6 illustrates an example in which the electrical wires 40 covered by the bonder cap 30 are the two electrical wires 40 in which the conductor parts 41 are connected together. However, the number of electrical wires 40 in which the conductor parts 41 are connected together may be three or more, and the bonder cap 30 may be overlaid on the three or more electrical wires 40.

Figure 7:
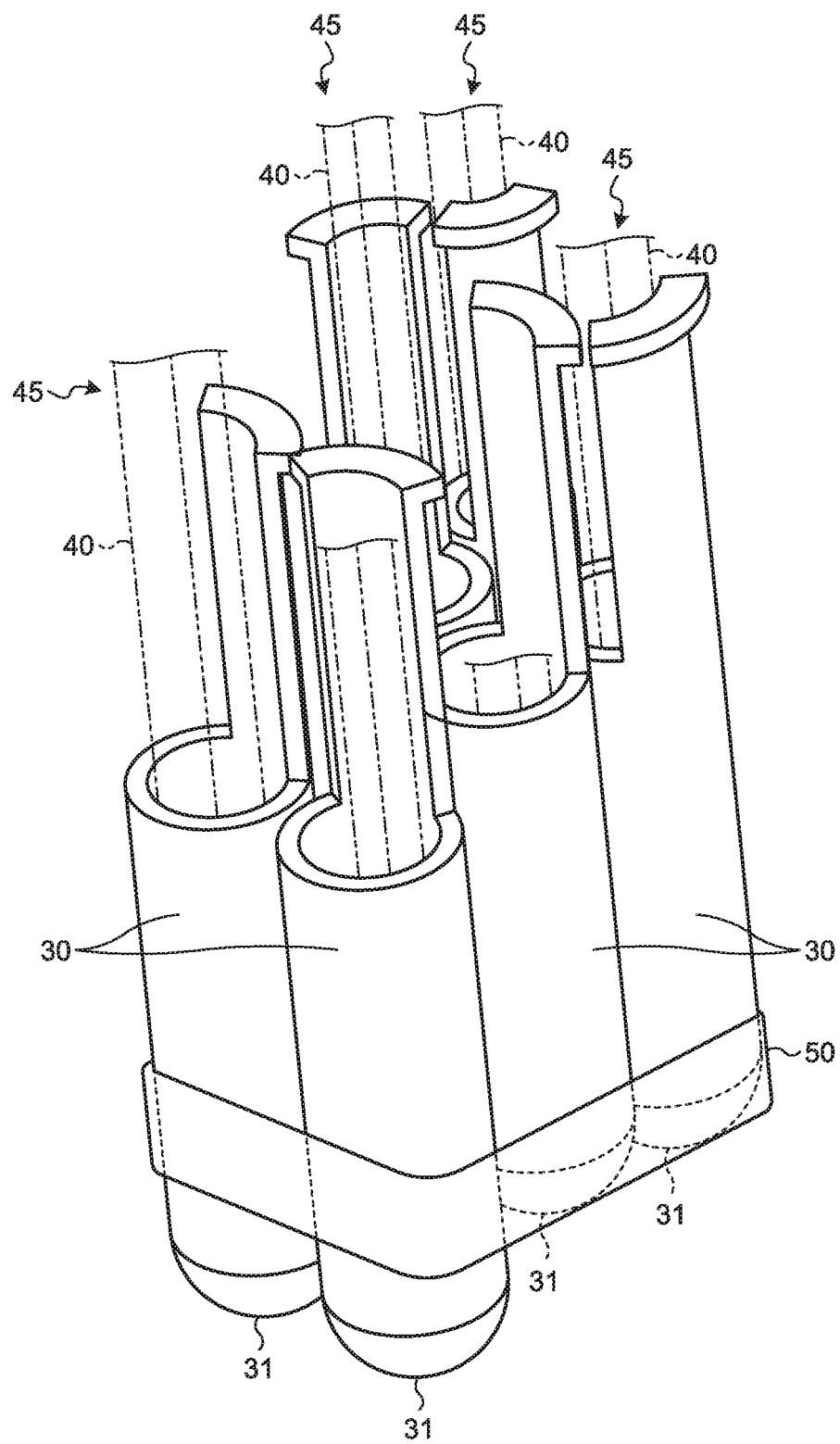
FIG. 7 is an explanatory view of a state in which a plurality of bonder caps each configured as the one illustrated in FIG. 6 are used and tied together.

FIG. 7 is an explanatory view of a state in which the two or more bonder caps 30 each configured as the one illustrated in FIG. 6 are used and tied together. In the accommodating part 20 (see FIG. 3), the two or more bonder caps 30 are accommodated, and two or more bonder caps 30 are accommodated while being tied together by a tying member 50. The tying member 50 that ties the bonder cap 30 together is formed of a belt-like member, and an adhesive tape is used therefor in the present embodiment. The tying member 50 formed of a belt-like member ties the two or more bonder caps 30 together by being integrally wound around the bonder caps 30 while the two or more bonder caps 30 included in the plurality of electrical wire bundles 45 are set oriented in the same direction.

In this tying, the tying member 50 ties the two or more bonder caps 30 at a position corresponding to the leading end side of the bonder caps 30. That is, the tying member 50 is wound around the tied two or more bonder caps 30 in a position relatively close to the leading end portions 31 in the lengthwise direction of each of the bonder caps 30.

The sizes of the two or more bonder caps 30 that are tied together by the tying member 50 do not necessarily need to be uniform. The two or more bonder cap 30 used herein may have different diameters or different lengths.

Additionally, when the two or more bonder caps 30 are tied together by the tying member 50, the relative positions of the bonder caps 30 do not necessarily need to be strictly set uniform in the lengthwise direction of each of the bonder caps 30. For example, in the present embodiment, the bottom part 22 (see FIG. 5) of the accommodating part 20 has the difference in level. The two or more bonder caps 30 therefore may be tied together by the tying member 50 with the relative positions thereof varied in the lengthwise direction of each of the bonder caps 30 so as to adapted to the difference in level of the bottom part 22 of the accommodating part 20 as illustrated in FIG. 7.

Figure 8:
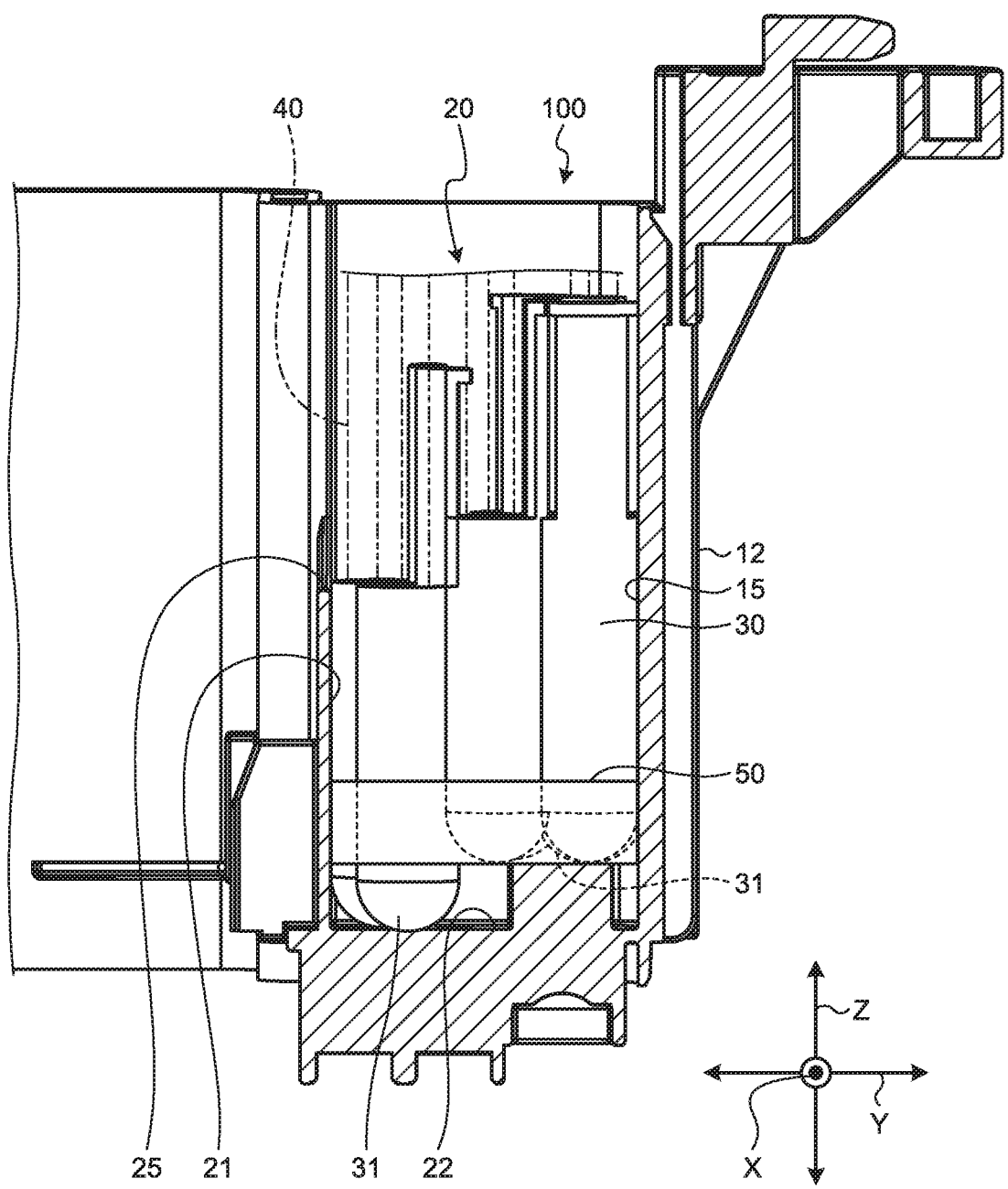
FIG. 8 is a sectional view of a main part with the bonder caps illustrated in FIG. 7 accommodated in the accommodating part.

FIG. 8 is a sectional view of a main part with the two or more bonder caps 30 illustrated in FIG. 7 accommodated in the accommodating part 20. The electrical connection box 1 according to the present embodiment includes a structure 100 for accommodating the bonder caps 30 that is provided in the housing 10. The accommodating structure 100 includes the plurality of electrical wire bundles 45 covered by the bonder caps 30, the tying member 50, and the accommodating part 20. In the structure 100 for accommodating the bonder caps 30 according to the present embodiment, the two or more bonder caps 30 are accommodated in the accommodating part 20, and the single accommodating part 20 accommodates therein the two or more bonder caps 30 that have been tied together by the tying member 50. That is, the two or more bonder caps 30 that have been tied together by the tying member 50 are inserted into the accommodating part 20 from one side thereof having the opening part 25, and the accommodating part 20 integrally accommodates therein the two or more bonder caps 30. When being accommodated into the accommodating part 20, the bonder caps 30 are set oriented in such a manner that the respective leading end portions 31 of the bonder caps 30 are positioned closer to the bottom part 22 of accommodating part 20. Thus, the two or more bonder caps 30 tied as one by the tying member 50 are accommodated by the accommodating part 20 with the leading end portions 31 of the bonder caps 30 in contact with the bottom part 22 of the accommodating part 20.

Herein, the dimension of the accommodating part 20 in a certain direction, such as the first direction X or the second direction Y, perpendicular to the third direction Z is smaller than the dimension in the certain direction that the two or more bonder caps 30 that have been tied together by the tying member 50 have before being accommodated in the accommodating part 20. The bonder cap 30 is a member made of synthetic resin, thus being elastic. Therefore, when being inserted and accommodated into the accommodating part 20, the two or more bonder caps 30 are press-fit with the bonder caps 30 being elastically deformed. Thus, after the two or more bonder caps 30 are accommodated in the accommodating part 20, pressure is generated between the bonder caps 30 and each of the wall parts 21 that constitute the accommodating part 20 and between the bonder caps 30 and each of the inner walls 15 of the frame 12. Large frictional force generated with this pressure makes the two or more bonder caps 30 unlikely to come off from the accommodating part 20. Consequently, the two or more bonder caps 30 that have been accommodated in the accommodating part 20 are unlikely to come off from the downward-opening opening part 25 of the accommodating part 20 and are kept accommodated in the accommodating part 20.

When the bonder caps 30 are in a state thus accommodated in the accommodating part 20, each of the electrical wires 40 that have the end portions thereof covered by the corresponding bonder cap 30 is extended from the bonder cap 30 downward in the third direction Z and is wired as appropriate.

With the above-described structure 100 for accommodating the bonder cap 30 according to the embodiment, the two or more bonder caps 30 are tied together by having the tying member 50 wound around the two or more bonder caps 30 that have been combined as one, and the two or more bonder caps 30 that have been tied together by the tying member 50 are accommodated as one in the accommodating part 20. Thus, even in a case where the plurality of electrical wire bundles 45 each of which has the plurality of electrical wires 40 therein covered by the corresponding bonder cap 30 are used, the bonder caps 30 that correspond to the plurality of electrical wire bundles 45 can be collectively accommodated in the accommodating part 20. Therefore, the work of attaching the bonder caps 30 can be prevented from becoming burdensome. Consequently, even when two or more of the bonder caps 30 are used, the two or more bonder caps 30 can be attached with ease. As a result, the easiness of the attachment work can be ensured.

Even when two or more of the bonder caps 30 are used, the need to accommodate the two or more bonder caps 30 one by one into the accommodating part 20 is eliminated. The bonder caps 30 can be accommodated in a shorter period of time, the attachment work can be curtailed. As a result, the manufacturing cost can be reduced.

Additionally, only the single accommodating part 20 is needed even when two or more of the bonder caps 30 are used. The number of wall parts 21 forming the accommodating part 20 is smaller than otherwise. Therefore, material expenses for manufacturing the housing 10 can be reduced. Reduction in number of wall parts 21 can also contribute to size reduction of the housing 10. As a result of these effects, not only the manufacturing cost can be reduced but also the electrical connection box 1 that is provided with the accommodating part 20 that accommodates therein two or more of the bonder cap 30 can be made smaller in size.

Furthermore, the tying member 50 ties together two or more of the bonder caps 30 in a position relatively near to the leading ends in the bonder caps 30, that is, in one side thereof having the leading end portions 31. Tying force applied to positions in another side opposite to the side having the leading end portions 31 in the lengthwise direction of each of the bonder caps 30 can be reduced. That is, when the two or more bonder caps 30 are tied together by the tying member 50, the tying is effected by having the tying member 50 wound around the bonder caps 30. Therefore, tying force, which is force that works to tie together the two or more bonder caps 30, is applied to the bonder caps 30 from the tying member 50. The tying force that is applied to the bonder caps 30 from the tying member 50 is the strongest in a position around which the tying member 50 is wound. The tying force is weaker in a position more apart from the position around which the tying member 50 is wound. For this reason, when the two or more bonder caps 30 are tied together by the tying member 50 in a position relatively near to the leading end portions 31 in the bonder caps 30, the tying force from the tying member 50 is weaker in the side opposite to the side having the leading end portions 31 in the lengthwise direction of each of the bonder caps 30.

The bonder cap 30 is a member made of synthetic resin and is therefore elastic. Therefore, when being tied together by the tying member 50, the two or more bonder caps 30 is elastically deformed by the tying force from the tying member 50 in a position around which the tying member 50 is wound, and become smaller in dimension in a direction perpendicular to the third direction Z. In contrast, in a position relatively apart from the tying member 50, that is, in a position in the side opposite to the side having the leading end portions 31 in the lengthwise direction of each of the bonder caps 30, the tying force from the tying member 50 is relatively weak. Therefore, the two or more bonder caps 30 are unlikely to become smaller in dimension in a direction perpendicular to the third direction Z.

Thus, when the two or more bonder caps 30 are accommodated in the accommodating part 20, pressure between the wall parts 21 and the inner walls 15 of the frame 12 that form the accommodating part 20 and the bonder caps 30 is made more likely to occur in a position in the side opposite to the side having the leading end portions 31 in the lengthwise direction of each of the bonder caps 30. Therefore, securing of frictional force between the two or more bonder caps 30 and the accommodating part 20 can be easier. As a result, the two or more bonder caps 30 that have been accommodated in the accommodating part 20 can be prevented from coming off from the accommodating part 20.

When the two or more bonder caps 30 are tied together by the tying member 50, the tying member 50 is wound around in a position in one side of the bonder caps 30 having the leading end portions 31. The entire shape of a bundle of the two or more bonder caps 30 can be therefore made tapered toward the leading end portions 31. Thus, the two or more bonder caps 30 that have been tied together by the tying member 50 can be more easily inserted into the accommodating part 20 when being accommodated into the accommodating part 20. Furthermore, when the tying member 50 is wound around in a position in one side of the bonder caps 30 having the leading end portions 31, the entire shape of the bundle of the two or more bonder caps 30 can be therefore more easily widened toward the side opposite to the leading end portions 31 in the bonder caps 30. Therefore, the two or more bonder caps 30 that have been inserted into the accommodating part 20 are made unlikely to come off from the accommodating part 20. As a result of these effects, the two or more bonder caps 30 can be more easily inserted into the accommodating part 20 and less likely to come off from the accommodating part 20.

In the electrical connection box 1 according to the embodiment, the housing 10 that accommodates therein the electronic component 5 includes the structure 100 for accommodating the bonder caps 30 according to the present embodiment, two or more of the bonder caps 30 can be collectively accommodated in the accommodating part 20 even when the two or more bonder caps 30 are used. Therefore, two or more of the bonder caps 30 can be attached easily, and as a result, the easiness of the attachment work can be ensured.

The wire harness WH according to the embodiment includes the conductive routing members W and the electrical connection box 1, and, in the electrical connection box 1, the housing 10 includes the structure 100 for accommodating the bonder caps 30 according to the present embodiment. Therefore, two or more of the bonder caps 30 can be easily attached even when the two or more bonder caps 30 are used. As a result, the easiness of the attachment work can be ensured.

In the electrical connection box 1 according to the embodiment, the connector holder 16 is disposed under the base 17 provided to the inner wall 15 of the frame 12 included in the housing 10. Thus, a disposition structure in a section inside the housing 10 of the electrical connection box 1 where other components are connected is made into a layered structure in the third direction Z, whereby a space can be saved. As a result, the size of the electrical connection box 1 can be reduced.

With the connector holder 16 disposed under the base 17 provided to the inner wall 15 of the frame 12, the electrical wire extending from the joint connector 6 connected to the connector holder 16 can be extended in a direction intersecting the third direction Z. The electrical wire extending from the base 17 extends downward in the third direction Z. When the electrical wire extending from the joint connector 6 connected to the connector holder 16 can be extended in a direction intersecting the third direction Z, the electrical wire extending from the joint connector 6 and the electrical wire extending from the base 17 are come into contact with each other, directions in which these electrical wires extend are regulated by each other. Therefore, when the electrical wires are wired, unnecessary movements of the electrical wires are prevented, and the electrical wires are prevented from biting other members.

Modification

In the embodiment described above, an adhesive tape is used for the tying member 50 that ties the two or more bonder caps 30. However, another option than an adhesive tape may be used for the tying member 50. For example, a stretchable rubber band or what is called a cable tie made of resin may be used for the tying member 50. When a member that can appropriately change the length thereof during the tying in accordance with properties of the bonder caps 30 is used for the tying member 50, the tying member 50 can appropriately tie the bonder caps 30 regardless of how each of the bonder caps 30 is formed.

In the embodiment described above, the accommodating part 20 has a substantially rectangular shape as viewed in the third direction Z. However, the accommodating part 20 may have a shape other than a rectangular shape. The shape of the accommodating part 20 is desirably determined as appropriate in accordance with the configurations of the other sections of the housing 10.

In the embodiment described above, the single accommodating part 20 is provided in the housing 10, two or more of such accommodating parts 20 may be provided in the housing 10. The number of such accommodating part 20 disposed in the housing 10 is not limited when each of the accommodating parts 20 is configured to collectively accommodate therein two or more of the bonder caps 30 as one that have been tied by the tying member 50.

According to the bonder cap accommodating structure, the electrical connection box, and the wire harness according to the present embodiment, a tying member are wound around two or more bonder caps that have been combined together as one, whereby the two or more bonder caps that have been tied together, and the two or more bonder caps that have been tied together by the tying member are accommodated as one in the accommodating part. Therefore, two or more bonder caps can be easily attached even when the two or more bonder caps are used. As a result, an effect of ensuring the easiness of the attachment work can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bonder cap accommodating structure comprising:
a plurality of electrical wire bundles each having conductor parts in a plurality of electrical wires therein connected together and covered by a bonder cap;
a tying member configured to tie the bonder caps together by being integrally wound around the bonder caps that are included in the electrical wire bundles;
an accommodating part into which the bonder caps that have been tied together by the tying member are inserted and in which the bonder caps are integrally accommodated; and
each of the bonder caps has a first portion and a second portion, and the tying member wraps around the first portion of each of the bonder caps and exposes the second portion of each of the bonder caps.

2. The bonder cap accommodating structure according to claim 1, wherein
the tying member ties the bonder caps in a position in a side of leading ends of the bonder caps.

3. The bonder cap accommodating structure according to claim 1, wherein
the each of bonder caps has a leading end portion, and an open end opposite to the leading end portion in a longitudinal direction of the bonder cap,
each of the plurality of wire bundles extends through the open end and into a respective one of the bonder caps, and
the second portion of each of the bonder caps extends from the tying member to the open end.

4. The bonder cap accommodating structure according to claim 1, wherein
the each of bonder caps has a leading end portion, and an open end opposite to the leading end portion in a longitudinal direction of the bonder cap,
each of the plurality of wire bundles extends through the open end and into a respective one of the bonder caps, and the tying member covers the leading end portion of at least one of the bonder caps.

5. The bonder cap accommodating structure according to claim 4, wherein
the tying member exposes the open ends of at least one of the bonder caps.

6. The bonder cap accommodating structure according to claim 1, wherein
the each of bonder caps has a leading end portion, and an open end opposite to the leading end portion in a longitudinal direction of the bonder cap,
each of the plurality of wire bundles extends through the open end and into a respective one of the bonder caps,
the accommodating part has a plurality of wall parts and a bottom part connected to and extending from each of the wall parts,
the bottom part closes the accommodating part, and
the leading end portion of each of the bonder caps abuts the bottom part of the accommodating part.

7. An electrical connection box comprising:
a housing configured to accommodate an electronic component; and
a bonder cap accommodating structure provided in the housing, wherein
the bonder cap accommodating structure includes
a plurality of electrical wire bundles each having conductor parts in a plurality of electrical wires therein connected together and covered by a bonder cap,
a tying member configured to tie the bonder caps together by being integrally wound around the bonder caps that are included in the electrical wire bundles, and
an accommodating part into which the bonder caps that have been tied together by the tying member are inserted and in which the bonder caps are integrally accommodated.

8. A wire harness comprising:
a conductive routing member; and
an electrical connection box connected to the routing member, wherein
the electrical connection box includes
a housing configured to accommodate an electronic component, and
a bonder cap accommodating structure provided in the housing, and the bonder cap accommodating structure includes
a plurality of electrical wire bundles each having conductor parts in a plurality of electrical wires therein connected together and covered by a bonder cap, the electrical wires forming the routing member,
a tying member configured to tie the bonder caps together by being integrally wound around the bonder caps that are included in the electrical wire bundles, and
an accommodating part into which the bonder caps that have been tied together by the tying member are inserted and in which the bonder caps are integrally accommodated.

* * * * *